United States Patent [19]

Schap

[11] Patent Number: 5,105,131
[45] Date of Patent: Apr. 14, 1992

[54] POWER DRIVE SYSTEM FOR SLIDING DOOR

[75] Inventor: William W. Schap, Muskegon, Mich.

[73] Assignee: Alfred Teves GmbH, Frankfurt am Main, Fed. Rep. of Germany

[21] Appl. No.: 587,278

[22] Filed: Sep. 24, 1990

[51] Int. Cl.$^5$ ............................................. H02P 3/00
[52] U.S. Cl. ..................................... 318/282; 49/280; 49/139
[58] Field of Search ................. 318/282–286, 318/466–468, 626, 628, 640, 652; 49/26, 43, 118, 138, 139, 199, 280, 324, 334, 281, 360

[56] References Cited

U.S. PATENT DOCUMENTS

| | | | |
|---|---|---|---|
| 3,653,154 | 4/1972 | Hayday | 49/281 X |
| 3,785,089 | 1/1974 | Smith | 49/199 X |
| 4,234,833 | 11/1980 | Barrett | 318/282 |
| 4,248,016 | 2/1981 | Pecchioni | 49/199 X |
| 4,529,920 | 7/1985 | Yoshida et al. | 318/466 |
| 4,563,625 | 1/1986 | Kornbrekke et al. | 318/283 X |
| 4,640,050 | 2/1987 | Yamagishi et al. | 49/280 |
| 4,862,640 | 9/1989 | Boyko et al. | 49/280 X |
| 4,922,168 | 5/1990 | Waggamon et al. | 318/286 |
| 4,965,502 | 10/1990 | Ogasawara | 318/286 X |

Primary Examiner—William M. Shoop, Jr.
Assistant Examiner—A. Jonathan Wysocki
Attorney, Agent, or Firm—Robert P. Seitter; J. Gordon Lewis

[57] ABSTRACT

A power drive system for a sliding door, such as those employed on van type vehicles, enables a positive drive powered operation of the door by a control switch remote from the door and a programmed electronic control unit while accommodating manual operation of the door without mechanical interference or resistance from the drive or altering of the drive control program. A push/pull cable connected to the door is in positive meshed engagement at all times with a rotary drive gear whose rotative displacement from a rest position is continuously transmitted to the electronic control unit as a door position input signal. During powered operation of the door, the control unit is programmed to actuate or control a reversible drive motor or associated devices when the door is at selected positions along its path of movement. The drive motor is mechanically coupled to the drive gear via a normally disengaged clutch which is automatically engaged to establish a positive mechanical drive connection between the motor and drive gear only while the motor is in operation.

14 Claims, 3 Drawing Sheets

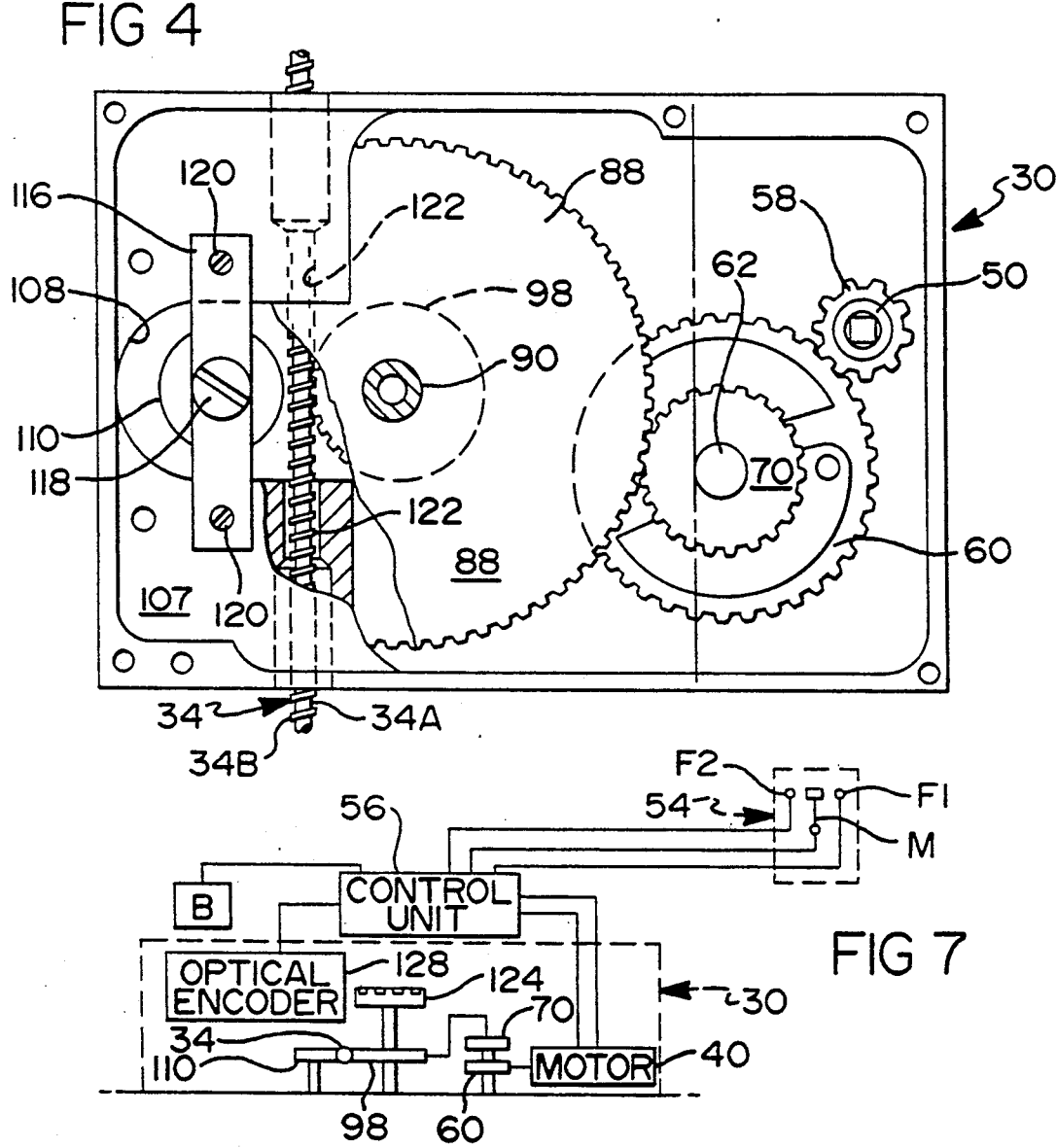
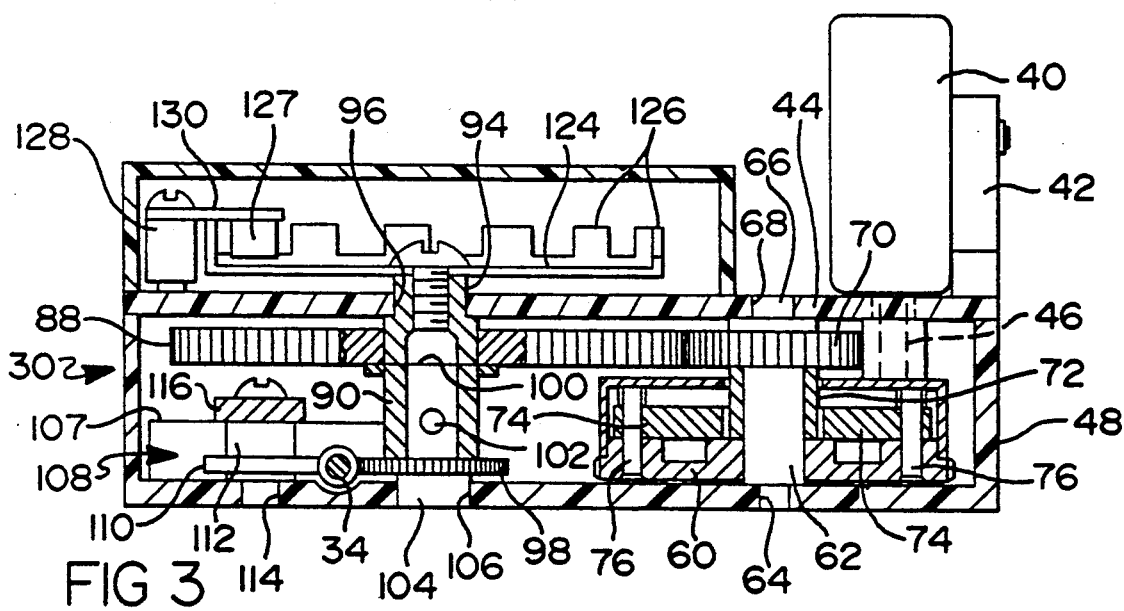

POWER DRIVE SYSTEM FOR SLIDING DOOR

BACKGROUND OF THE INVENTION

The present invention relates to a power drive system for driving a sliding door in movement between an open and a closed position. It is particularly directed to a drive arrangement which accommodates shifting between manual and positively driven powered operation of the door at any position along its path of movement while incorporating in the power drive a control responsive to an overload to stop the door in the event an object is trapped by the closing door. While useful in other applications, the power drive system of the present invention is especially well adapted for use in operating the sliding door of a van type vehicle.

All power drive systems for sliding doors require a power system capable of driving an output member coupled to the door to drive the door in either direction over a relatively long working stroke, and for optimum control of the door movement, a positive mechanical interconnection between the motor and door operable in either direction of movement is required. In addition to the foregoing considerations applicable to sliding doors in general, further problems are presented where the drive is to power the sliding door of a van.

In the van application of the power drive system the sliding door is conventionally mounted at the passenger side of the van and a major convenience of the system is that it may be power operated by control switches accessible from the drivers seat. However, if the driver is outside the van loading or unloading articles through the sliding door, the power controls are out of reach and there are many occasions where in this situation, the driver will want to open or close the door manually. If the door is positively mechanically linked to the power source of the drive, this connection will interfere with manual operation of the door and, in the case of certain types of control systems, disturb a relationship between the door and drive relied upon by the control system to sense the position of the door along its path of travel.

In addition, for obvious reasons, it is desirable that exposure of the moving parts of the drive system be minimized. Fitting the drive into existing cavities within the vehicle body is a goal which cannot always be achieved.

The drive of the present invention presents a practical solution to the problems discussed above.

SUMMARY OF THE INVENTION

In accordance with the present invention, the door drive system utilizes a push/pull cable coupled at one end to the door and guided in longitudinal movement within a guide track which extends parallel to the path of movement of the door along the lower edge of the door opening. The cable is driven in longitudinal movement by a reversible electric motor controlled by an electronic control unit in a manner such that the door may be automatically stopped upon the sensing of an overload, such as the jamming of an object between the closing door and the door frame, or providing for express operation and cancellation.

A wire like member is helically wound in uniformly spaced turns around the core of the push/pull cable over its entire length and a drive gear rotatively mounted within a gear box fixed to the vehicle frame is tangentially engaged by the cable with the teeth of the drive gear in positive meshed engagement with the cable between adjacent turns of the wire. An idler roller freely rotatable within the gear box maintains the cable in meshed tangential engagement with the drive gear. Cable guide means in the gear box guide the cable through the box in a straight line path between the opposed peripheries of the idler and drive gear.

The cable projects from its guide track entirely through the gear box and the cable passes from the gear box into a storage housing having a spirally configured cable guide passage which compactly stores that portion of the cable projecting beyond the gear box. The gear box, reversible drive motor and storage housing may be conveniently mounted on the vehicle floor beneath the front passenger seat of the van.

The output shaft of the drive motor is positively connected via a second gear in the gear box to the input side of a normally disengaged centrifugal clutch. The output side of the clutch is positively meshed with the drive gear meshed with the cable. The clutch is so designed as to positively couple the input and output sides of the clutch only when its input side is driven in rotation by the drive motor. When the drive motor is not operating, the clutch elements are spring biased to a disengaged position so that the output side of the clutch and the drive gear meshed with the output side of the clutch may rotate freely to accommodate longitudinal movement of the cable through the gear box upon manual movement of the door.

The electronic control unit which controls operation of the drive motor is controlled in turn by a sensing unit which transmits to the control unit a signal representative of the position of the door along its path of movement. This signal may be generated by an optical encoder mounted within the gear box to generate signal pulses in response to rotary movement of a toothed wheel encoder disc which is rotatively fixed to the drive gear meshed with the cable.

Essentially, the electronic control unit counts the number of pulses transmitted to it by the encoder to determine the displacement of the door from its fully closed position and utilizes this information to control the motor. Insofar as the encoder is concerned, it transmits the same count to the control unit whether the encoder disc is being driven in rotation by the drive motor during powered operation of the door or the encoder disc is being driven in rotation by manual movement of the door transmitted to the disc via the meshed engagement between the push/pull cable and the drive gear upon which the encoder disc is rotatively fixed. This enables shifting from manual to powered operation or vice versa when the door is at any position along its path of movement without requiring realignment of the door position detecting system.

Other objects and features of the invention will become apparent by reference to the following specification and to the drawings.

BRIEF DESCRIPTION OF THE DRAWINGS

FIG. 3 is a detailed cross sectional view of a gear box embodying the present invention;

FIG. 4 is a top plan view of the interior of the gear box of FIG. 3 with the cover and certain parts of the device removed;

FIG. 7 is a schematic diagram indicating the relationship of the power drive to its control units.

In FIGS. 1 and 2, there is shown a van V having a sliding door D located on the passenger side of the vehicle. Vans utilizing such doors have been available for many years and the structural arrangements by which the door is mounted on the vehicle for manual movement between the closed position shown in FIGS. 1 and 2 in which the door is sealingly seated in a door opening and an open position in which the door is disposed at the side of the van rearwardly of the door opening is well known. In the standard arrangement, the door is latched in its closed position, typically by mechanical latches 20 and 22 at the front and rear edges of the door, the latches being mechanically linked to a latch actuator 24 mounted within the door to be simultaneously released by manual actuation of appropriate door handles In many cases, the rear latch 22 may include a power driven striker mechanism 25 which is latchingly engaged with the door as it approaches its closed position and is power driven to move the latched door to its fully closed position.

Figure 1:
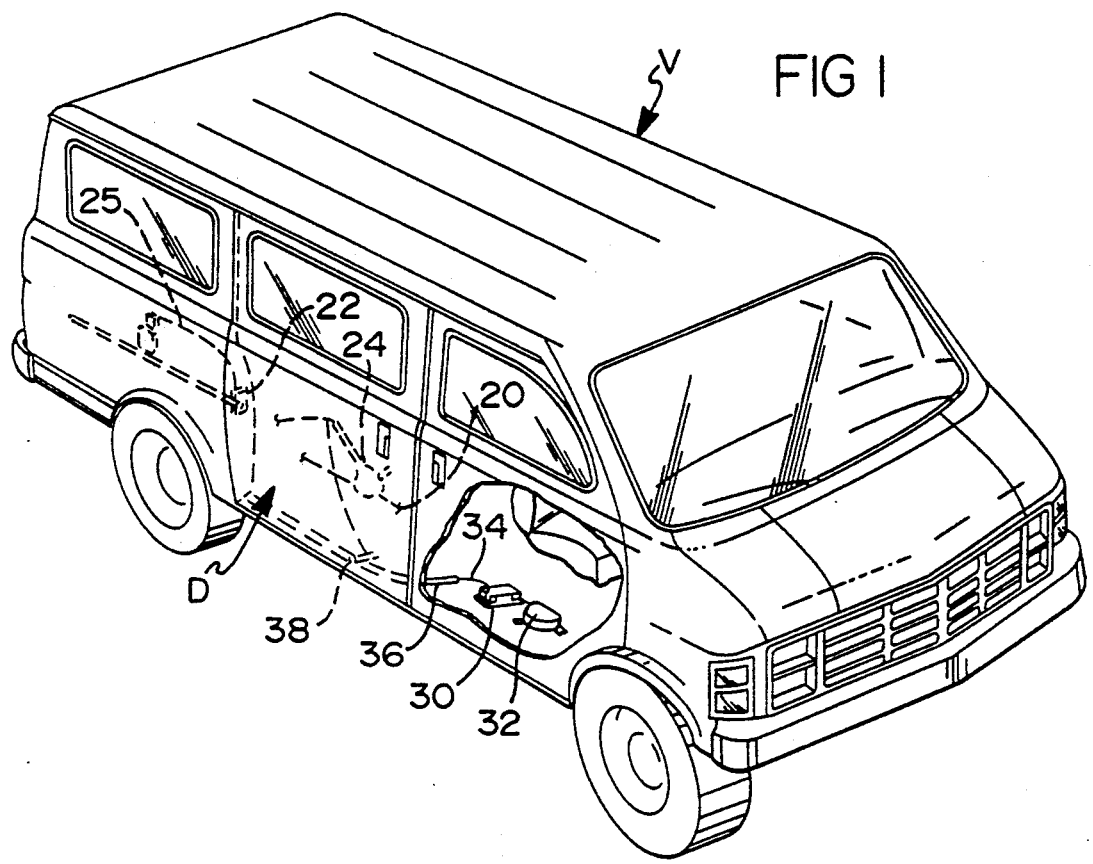
FIG. 1 is a perspective view of a van, with certain parts broken away, showing the general location of certain components of the present invention within the vehicle.
Figure 2:
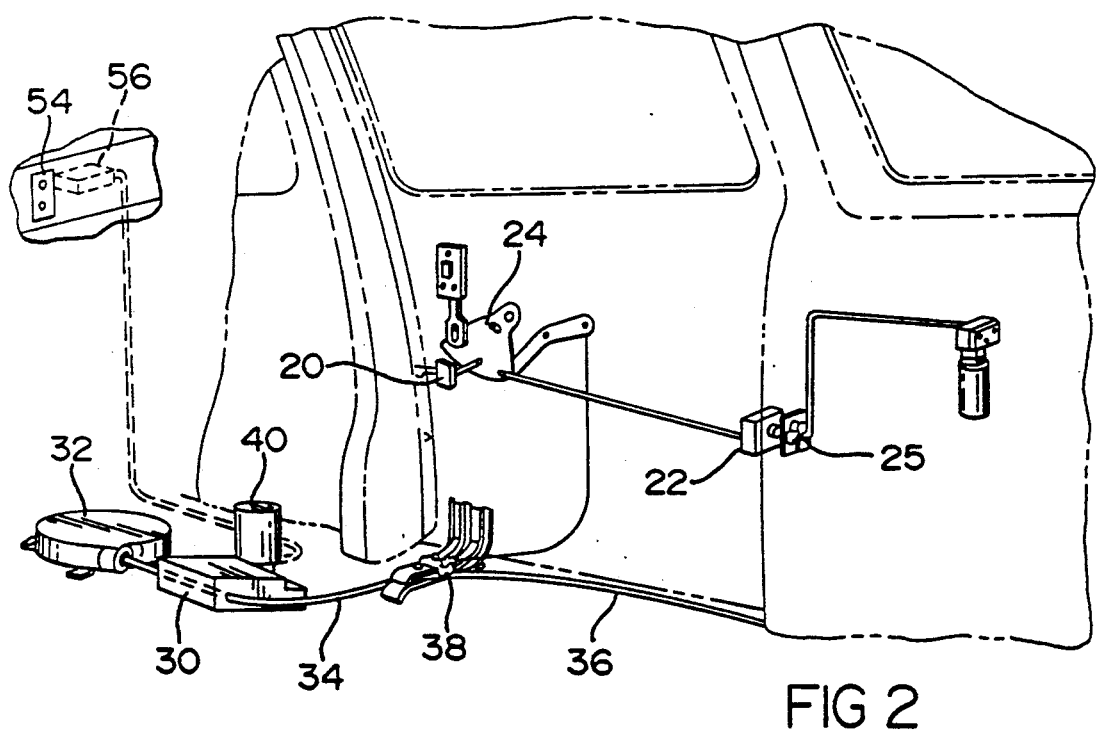
FIG. 2 is a perspective view of a portion of the interior of the van of FIG. 1 with certain parts broken away or omitted.

The present invention is directed to certain components of a power drive system by means of which the sliding door can be power driven in either direction between its open and closed positions. The power drive system includes a motor driven gear box 30 which is selectively operable to drive an elongate flexible push-/pull cable 34 in forward and rearward sliding movement within a cable guide track designated generally 36 fixedly mounted on the vehicle frame to extend along the lower edge of the door opening along a path parallel to the path of movement of the door between its open and closed positions. One end of the cable is operatively coupled to the door at a conventional door mounting bracket 38 so that power driven movement of cable 34 forwardly and rearwardly through guide track 36 drives the door D between its open and closed position. The coupling arrangement between cable 34 and door D is such that initial movement of cable 34 in a door opening direction is transmitted to latch release mechanism 24 to release the door latches.

Cable 34 extends forwardly of the vehicle from the front end of guide track 36, passes entirely through gear box 30 and extends forwardly from the gear box into a cable storage housing 32, the cable being fed into storage housing 32 during forward movement of cable 34 and being withdrawn from housing 32 during rearward movement. Gear box 30 and housing 32 may conveniently be mounted on the vehicle floor beneath the front passenger side seat. The motor 40 which drives cable 34 via gear box 30 is a reversible motor controlled by appropriate directional switches 54 mounted on the vehicle dash within reach of the driver's seat, the switches 54 being operatively connected to motor 40 via an electronic control unit 56. Parallel connected control switches may be mounted at other locations on the vehicle, if desired The employment of an electronic control unit enables the power drive for the door to be operated in a safe and efficient manner, as by providing the door with an antipinch capability by automatically stopping the drive if an object becomes trapped between the closing door and the door frame, providing for express operation and eliminating the need for limit switches to sense specific door positions. Electronic control units capable of being programmed to perform these, and similar functions, are well known and commercially available from a variety of sources.

Details of the gear box drive are best seen in FIGS. 3-6. Referring first to FIGS. 3 and 4, the reversible motor 40 is mounted upon a mounting bracket 42 resiliently mounted on the cover 44 of gear box 30 with a flexible motor shaft 46 projecting downwardly through a hole in cover 44 into the interior of the base 48 of the gear box. Motor shaft 46 is slidably received within and rotatively locked to the hub 50 of a pinion gear 58 mounted for rotation about a fixed axis within gear box base 48. As best seen in FIG. 3, pinion 58 is operatively meshed with a drive gear 60 which is freely rotatable about a shaft 62 whose lower end (FIG. 3) is received with a slip fit in a bore 64 in the base 48 and whose upper end 66 is received within a bore 68 in housing cover 44.

Gear 60 constitutes the input member of a centrifugal clutch whose output member is constituted by a second gear 70 having a downwardly projecting hub 72 which is press fitted on shaft 62 for free rotation relative to gear 60.

Figure 5:
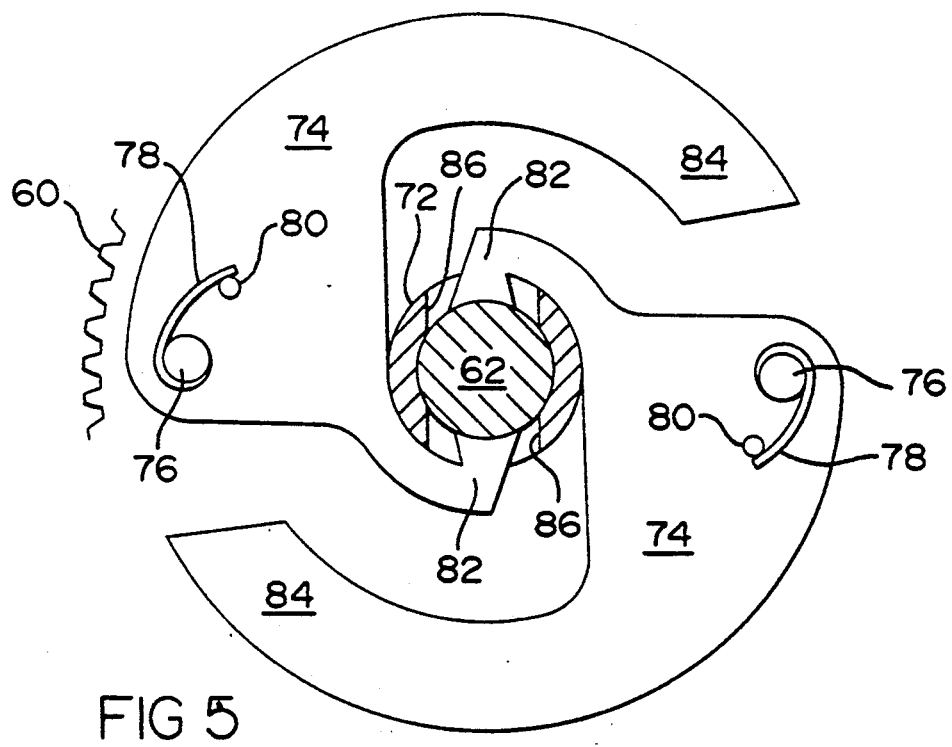
FIG 5 is a top plan view, partially in section, of elements of a centrifugal clutch showing the clutch engaged.
Figure 6:
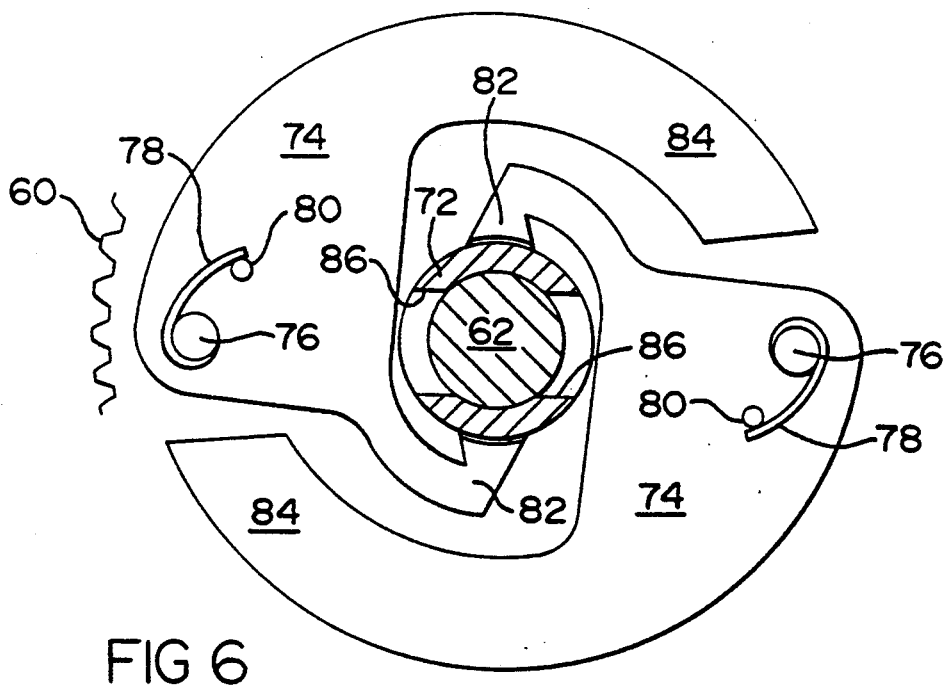
FIG. 6 is a plan view of the clutch as shown in FIG. 5 showing the clutch elements disengaged.

Referring now to FIGS. 5 and 6, the centrifugal clutch takes the form of a pair of clutch pawls 74 pivotally mounted upon gear 60 by a pair of pivot pins 76 located at diametrically opposed positions on gear 60. Torsion springs 78 engaged between pins 76 and stop pins 80 fixedly mounted on pawls 74 resiliently bias the pawls in a clockwise direction about their respective pivot pins 76 as viewed in FIGS. 5 and 6 to the disengaged position shown in FIG. 6.

Each of the pawls 74 is formed with a pawl tooth 82 at one extremity of pawl 74 and an arcuate arm portion 84 at the opposite extremity Arm portion 84 locates the center of mass of the pawl 74 relative to its pivot 76 so that upon rotation of gear 60 in either direction, the pawl is urged by centrifugal force to swing the arm end 84 of the pawl outwardly away from the shaft axis and thus swing the tooth portion of the pawl radially inwardly toward the axis of shaft 62. The hub 72 of gear 70 is formed with opposed axial slots 86 into which the teeth 82 of pawls 74 may project upon centrifugally induced pivotal movement of the pawls to establish a positive rotary drive coupling between the input gear 60 of the clutch and its output gear 70. When gear 60 is not being driven in rotation, springs 78 will resiliently bias their respective pawls 74 in a direction locating the pawl teeth 82 clear of the outer periphery of hub 72 of gear 70, and with the clutch so disengaged, gear 70 and its hub 72 can rotate freely relative to both gear 60 and shaft 62.

Referring now to FIGS. 3 and 4, the clutch output gear 70 is meshed with a relatively large diameter pinion gear 88 rotatively fixed to a hollow tubular hub 90 whose upper end 94 is rotatively received within a bore 96 in housing cover 44. A drive gear 98 is formed with an integral shaft 100 received within the lower end of hub 90 and rotatively locked to the hub as by a pin 102 A stub shaft 104 integral with gear 98 projects downwardly from the gear and is rotatively received within a bore 106 in the bottom of housing base 48.

At the left hand end, as viewed in FIGS. 3 and 4, the interior of housing base 48 is formed with an elevated platform portion 107 having, as best seen in FIG. 4, a U-shaped recess facing gear 98. Within recess 108, an idler wheel 110 is mounted for free rotation upon a stub shaft 112 having its lower end seated in a bore 114 in base 48 and having its upper end seated within a bore in a rigid mounting strap 116. As best seen in FIG. 4, strap 116 bridges recess 108 and is fixedly secured, as by screws 120, to platform 107.

Cable 34 is of a well known commercially available construction having a transversely flexible central core 34A around which a wire like member 34B is helically wound over the entire length of the cable.

Cable 34 is guided in movement through housing base 48 by a pair of aligned passages 122 through platform portion 107 of the housing which open at opposite sides of the U-shaped recess 108. Within the recess, the cable is gripped between the opposed peripheries of drive gear 98 and idler wheel 110, the cable tangentially engaging both of these peripheries. The helical winding 34B on the cable is formed with a pitch such that the teeth of gear 98 are meshed between adjacent turns of the winding in a positive drive relationship, this meshed engagement being maintained by the pressure applied by idler wheel 110 to the cable. This positive meshed engagement between gear 98 and cable 34 establishes a constant fixed relationship between longitudinal displacement of cable 34 and rotative displacement of gear 98. Power driven rotation of gear 98 requires a corresponding longitudinal displacement of cable 34, and longitudinal displacement of cable 34 induced by manual movement of the sliding door which is coupled to the cable will require a corresponding rotative movement of gear 98. The rotative position of gear 98, or more accurately, the rotary displacement of gear 98 from a selected rotative rest position, is thus representative of the position of the sliding door on its path of movement relative to the vehicle, regardless of whether the door has been located in that position by powered or by manual movement.

The rotative displacement of gear 98 from a preselected start position represents the position of the door along its path of travel and is utilized by the electronic control unit to control operation of drive motor 40. To transmit to the electronic control unit 56 a signal representative of the door position in turn represented by the rotative position of gear 98, an encoder disc 124 is fixedly secured upon the top of hub 94 in rotatively fixed relationship to gear 98. In the form shown in this application, the encoder disc 124 is formed with a series of upwardly projecting uniformly spaced teeth 126. A scanner arrangement is mounted upon housing cover 44 to include a pair of emitters 127 which may project a light beam across the path of movement of teeth 126 to a pair of receivers 128 which will generate a signal when exposed to the beam and terminate the signal when the beam is interrupted by the passage of a tooth 126 across the beam. The emitters 127 and receivers 128 may be supported from a circuit board 130 fixedly mounted on cover 44 and having a circuit operable to transmit signals from receivers 128 to the electronic control unit 56. Effectively, receivers 128 count the number of teeth 126 which break the beam between emitters 127 and receivers 128.

The rest position from which the count is started preferably is established by locating the door in its fully closed position and establishing the rotative position of gear 98 when the door is closed as the zero count position.

A schematic diagram of the drive system is shown in FIG. 7. The control switch 54 which controls powered operation of the system takes the form of a switch of the type employed to control power operated windows or sun roofs—a switch having a movable contact M located between, but out of contact with a spaced pair of fixed contacts F1, F2. When the movable contact M is manually shifted and held in contact with the fixed contact F1, motor 40 will drive in one direction as long as the contact is held closed or until control unit 56 determines the door has reached an end limit of movement and accordingly opens the circuit to motor 40 by disconnecting the battery B from the motor circuit. Shifting of the movable contact M to the other fixed contact F2 will cause the motor to drive in the opposite direction in a similar manner As explained above, the shaft of motor 40 is in positive meshed engagement with the input gear 60 of the centrifugal clutch, and driving gear 60 in rotation in either direction will cause the clutch to engage and the positively coupled input gear 60 of the clutch to its output gear 70. Gear 70 in turn drives gear 88 and, via hub 90, both gear 98 and encoder disc 124 rotate with gear 88. Rotation of gear 98 is directly transmitted to cable 34 via the positive intermeshed engagement of gear 98 with cable 34. Cable 34 in turn is coupled to the sliding door D so that longitudinal movement of the cable forwardly or rearwardly along its guide track 36 causes a corresponding forward or rearward movement of the door D. The pulse count transmitted by receivers 128 to control unit 56 enables the control unit to know at all times the location of the door along its path of movement While the primary purpose of the power drive is to provide the capability of controlling powered opening and closing of the sliding door from the driver's seat, there are frequent occasions when manual operation of the door is preferable or more convenient. The driver may, for example, load an article into the vehicle through the open door and wish to close the door before returning to the driver's seat. The system described above automatically mechanically disconnects the drive motor from the door at all times when the drive motor is not in operation so that the door may be manually operated without interference or resistance from the drive motor. The centrifugally actuated clutch establishes a positive drive connection between the drive motor and door automatically when the motor is operated and disengages when the motor is stopped. However, the ability of the electronic control unit to control powered operation of the door at selected positions along the path of travel of the door is totally unaffected by the mechanical disengagement of the clutch because the door position signal supplied to the electronic control unit is generated by that portion of the drive which is mechanically positively connected to the door at all times, whether the clutch is engaged or disengaged. Thus, the door may, for example, be power driven to its open position under the control of its electronic control unit, and then manually closed without mechanical interference from the drive or alteration of the programmed control of powered operation.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

What is claimed is:

1. A power drive system for a sliding door mounted on a rigid frame for guided forward and rearward movement along a fixed path between a forward end limit of movement wherein said door is in a closed position seated in a door opening in said frame and a rearward end limit wherein said door is in an open position rearwardly of said opening, said system comprising an elongate flexible push/pull cable, cable guide means mounted on said frame for guiding said cable in longitudinal movement along a cable path having a first path portion coextensive with said fixed path of movement of said door and a second path portion extending forwardly from said first path portion, means coupling the rearward end of said cable to said door for forward and rearward movement therewith, a first rotary member mounted on said frame for rotation about a first fixed axis at one side of said second path portion with said cable in engagement with the periphery of said first rotary member, means maintaining said cable and the periphery of said first rotary member in positive driving engagement with each other to coordinate longitudinal movement of said cable with rotation of said first rotary member about said first axis, a second rotary member mounted on said frame for rotation about a second fixed axis, reversible drive motor means positively coupled to said second rotary member operable to drive said second member rotary in rotation about said second axis, door drive control means for selectively operating said motor it drive in either direction, normally disengaged clutch means engageable to drivingly couple said first and second rotary members to each other only while said motor is operated, and sensing means for sensing the rotary displacement of said first rotary member from a selected rotative rest position for transmitting to said door drive control means a signal representative of the position of said door on said fixed path.

2. The invention defined in claim 1 wherein said cable comprises an elongate flexible cylindrical cable core and a wire like member wound around the exterior on said core in a helix extending the entire length of said cable, said first rotary member having gear teeth on its periphery meshingly engaged with said wire like member, and said means maintaining comprises an idler wheel mounted for free rotation about a fixed axis at the opposite side of said second path portion in tangential engagement with said cable.

3. The invention defined in claim 1 further comprising a cable storage housing mounted on said frame forwardly of said first rotary member for confining that portion of said cable which projects forwardly beyond said first rotary member.

4. The invention defined in claim 1 wherein said clutch means comprises a rotary output member positively drivingly coupled to said first rotary member, a rotary input member positively drivingly coupled to said second rotary member, positive coupling means including a recess in said output member and a tooth movably mounted on said input member operable when in seated engagement in said recess to rotatively lock said input and output members to each other, spring means biasing said tooth out of seated engagement in said recess, and means responsive to rotation of said input member for driving said tooth into seated engagement in said recess.

5. The invention defined in claim 1 wherein said sensing means comprises an encoder wheel having uniformly spaced teeth like members on its periphery, counting means fixedly mounted adjacent the periphery of said wheel for counting the number of teeth which pass said counting means and continuously transmitting the count to said control means, said selected rotative rest position of said first member being the rotative position of said first member corresponding to a selected position of said door.

6. A power drive system for a sliding door accommodating either manual or powered operations of said sliding door, said sliding door mounted on a rigid frame for guided forward and rearward movement along a fixed path between a forward end limit of movement wherein said door is in a closed position seated in a door opening in said frame and a rearward end limit of movement wherein said door is in an open position rearwardly of said opening, said system comprising:

an elongate door drive member including an elongate flexible push/pull cable, said cable having an elongate flexible cylindrical cable core and a wire-like member wound around an exterior of said core in a helix extending an entire length of said cable;

cable guide means mounted on said frame for guiding said cable in longitudinal movement along a cable path having a first path portion co-extensive with sad fixed path of movement of said door and a second path portion extending forwardly from said first path portion;

means directly coupling a rearward end of said cable to said door for forward and rearward movement therewith;

a first rotary member positively mechanically engaged with said door drive member for rotation coordinated with longitudinal forward and rearward movement of said door drive member, said first rotary member including a pinion gear having gear teeth meshingly engaged with said wire-like member of said door drive member, said first rotary member mounted on said frame for rotation about a first fixed axis at one side of said second path portion with said cable in engagement with a periphery of said first rotary member;

an idler wheel tangentially engaging said cable opposite said first rotary member to maintain said cable in tangential engagement with said first rotary member;

a cable storage housing mounted on said frame forwardly of said first rotary ember for confining that portion of said cable which projects beyond said first rotary member;

a second rotary member mounted on said frame for rotation about a second fixed axis;

reversible drive motor means positively coupled to said second rotary member operable to drive said second rotary member in rotation about said second axis;

door drive control means for selectively operating said motor means to drive in either direction;

normally disengaged clutch means engageable to drivingly couple said first and second rotary members to each other only while said motor means is operated, said clutch means including a rotary output member positively drivingly coupled to said first rotary member, a rotary input member positively drivingly coupled to said second rotary member, a pawl tooth pivotally mounted on said rotary input member, spring means pivotally biasing said pawl tooth to a rest position out of engagement with said rotary output member, said rotary output member having a recess therein adapted to receive said pawl tooth, said pawl tooth being pivotal upon said rotary input member into said recess by centrifugal force induced by rotation of said rotary input member and being operable when received in said recess to rotatively lock said rotary output member to said rotary input member; and sensing means responsive to rotary movement of said first rotary member for transmitting to said door drive control means a signal representative of the location of said door along said fixed path relative to a selected rotative rest position, said sensing means including an encoder wheel having uniformly spaced teeth-like members on a periphery of said encoder wheel, said encoder wheel positively mechanically coupled to said first rotary member, counting means fixedly mounted adjacent said periphery of said encoder wheel for counting teeth passing by said counting means and continuously transmitting a count to said door drive control means.

7. A sliding door system accommodating either manual or powered operations of a sliding door in forward and rearward movement along a fixed path between a door open and a door closed position, said system comprising an elongate door drive member coupled to said door for longitudinal forward and rearward movement with said door, first rotary means postively mechanically engaged with said door drive member for rotation coordinated with longitudinal forward and rearward movement of said door drive member, a variable speed reversible drive motor means having a rotary output shaft, clutch means for positively mechanically coupling said output shaft to said first rotary means in response to rotation of said output shaft in either direction and for accommodating free rotation of said first rotary means relative to said output shaft when said shaft is stationary, control means for selectively operating said motor and including an electronic control unit responsive to a signal representative of the location of said door along said fixed path to perform selected door control functions when said door is at selected locations along said fixed path, and sensing means responsive to rotary movement of said first rotary means for transmitting to said electronic control unit a signal representative of the location of said door along said fixed path wherein said clutch means comprises a rotary input member rotatable about a fixed axis and positively coupled to said output shaft, a rotary output member mounted for rotation about said fixed axis relative to said input member and said rotary output member positively coupled to said first rotary means, a pawl tooth pivotally mounted on said input member, spring means pivotally biassing said pawl tooth to a rest position out of engagement with said output member, said output member having a recess therein adapted to receive said tooth, said tooth being pivotal upon said input member into said recess by centrifugal force induced by rotation of said input member and being operable when received in said recess to rotatively lock said output member to said input member.

8. A sliding door system accommodating either manual or powered operations of a sliding door in forward and rearward movement along a fixed path between a door open and a door closed position, said system comprising an elongate door drive member coupled to said door for longitudinal forward and rearward movement with said door, first rotary means positively mechanically engaged with said door drive member for rotation coordinated with longitudinal forward and rearward movement of said door drive member, a variable speed reversible drive motor means having a rotary output shaft, clutch means for positively mechanically coupling said output shaft to said first rotary means in response to rotation of said output shaft in either direction and for accommodating free rotation of said first rotary means relative to said output shaft when said shaft is stationary, control means for selectively operating said motor and including an electronic control unit responsive to a signal representative of the location of said door along said fixed path to perform selected door control functions when said door is at selected locations along said fixed path, and sensing means responsive to rotary movement of said first rotary means for transmitting to said electronic control unit a signal representative of the location of said door along said fixed path, said system further comprising a gear box housing, said first rotary means and said clutch mean being mounted in said housing, said first rotary means comprising a first rotary drive member mounted in said housing for rotation about a first axis and coupled to said clutch means, a second rotary member mounted in said housing for free rotation about a second axis parallel to said first axis with the peripheries of said first and second rotary members in spaced opposed relationship to each other, and guide means on said housing guiding said elongate drive member through said housing along a path extending between the opposed peripheries of said first and second rotary members, the spacing between said members being such that said second rotary member maintains said drive member in driving engagement said first rotary member.

9. The invention defined in claim 7 wherein said door drive member is an elongate flexible push/pull cable coupled at its rearward end to the forward end of said door, said cable including an elongate flexible core and a wire like member wound about said core, and said first rotary means comprises a pinion having teeth meshed between the windings of said wire like member.

10. The invention defined in claim 9 wherein said cable tangentially engages said pinion, and said first rotary means further comprises an idler wheel tangentially engaging said cable to maintain said cable in tangential engagement within said pinion.

11. The invention defined in claim 8 wherein said first rotary member is a pinion gear and said drive member is an elongate flexible push/pull cable having uniformly longitudinal spaced projections meshed with said pinion gear.

12. The invention defined in claim 11 wherein said guide means guide said cable along a straight line path tangential to the peripheries of both of said first and second rotary members 13. The invention defined in claim 8 wherein said door drive member is an elongate flexible push/pull cable coupled at its rearward end to the forward end of said door, said cable including an elongate flexible core and a wire like member wound about said core, and said first rotary means comprises a pinion having teeth meshed between the windings of said wire like member.

14. The invention defined in claim 13 wherein said case tangentially engages said pinion, and said first rotary means further comprises an idler wheel tangentially engaging said cable to maintain said cable in tangential engagement within said pinion.

* * * * *